United States Patent [19]

Uemura et al.

[11] Patent Number: 4,572,789
[45] Date of Patent: Feb. 25, 1986

[54] DRILLING FLUID ADDITIVES

[75] Inventors: Michio Uemura, Kiryu; Yutaka Sato, Gunma; Masaru Nakamura, Gunma; Toyoshi Iida, Gunma, all of Japan

[73] Assignee: Japan Metals and Chemicals Co., Ltd., Tokyo, Japan

[21] Appl. No.: 592,743

[22] Filed: Mar. 23, 1984

Related U.S. Application Data

[63] Continuation of Ser. No. 264,040, May 15, 1981, abandoned.

[30] Foreign Application Priority Data

Nov. 27, 1980 [JP] Japan .................................. 55-166984
Mar. 30, 1981 [JP] Japan .................................. 56-46833

[51] Int. Cl.$^4$ ................................................. C09K 7/00
[52] U.S. Cl. ............................. 252/8.5 A; 252/8.5 C
[58] Field of Search ................. 252/8.5 A, 8.5 C; 260/429.3, 429.5, 124 R; 562/407, 408

[56] References Cited

U.S. PATENT DOCUMENTS 3,479,287 11/1969 Floyd et al. ...................... 252/8.5 C
4,052,448 10/1977 Schulz et al. ...................... 562/407
4,220,585 9/1980 Javora et al. ...................... 260/124 R
4,235,728 11/1980 Schulz et al. ...................... 252/8.5 C

FOREIGN PATENT DOCUMENTS 1276411 6/1972 United Kingdom .

Primary Examiner—Herbert B. Guynn
Assistant Examiner—Catherine S. Kilby
Attorney, Agent, or Firm—Parkhurst & Oliff

[57] ABSTRACT

A drilling fluid additive comprising a complex compound or complex compounds, at least one compound to be selected out of a group of compounds of titanium, zirconium and hafnium belonging to group IVb of the periodic table and, as desired, at least one lignin ensures, for a long period, significantly improved mud functions even at elevated temperatures under high pressure such as encountered in the depths of the earth.

9 Claims, 2 Drawing Figures

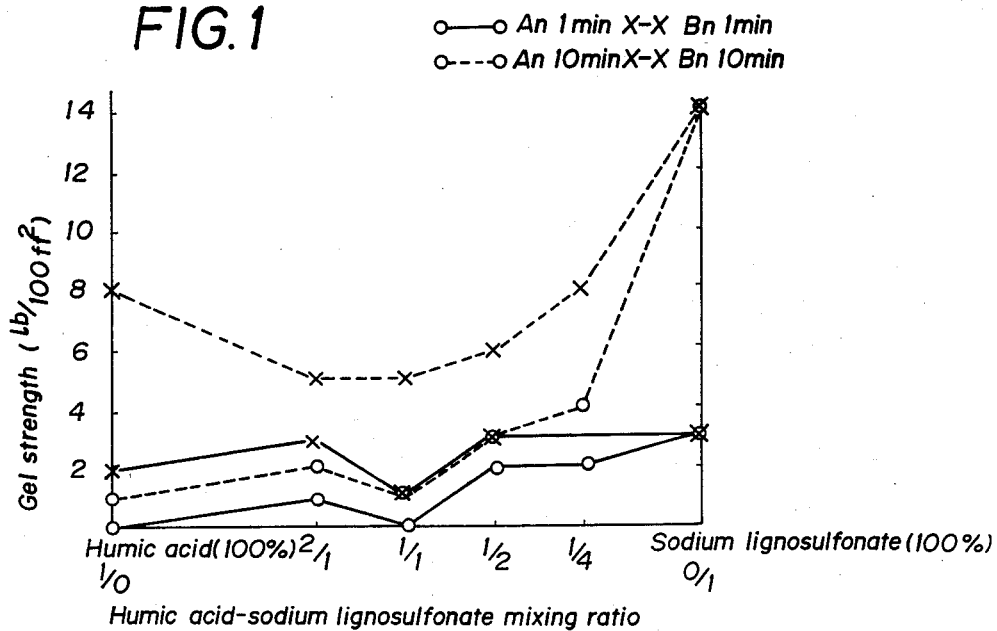
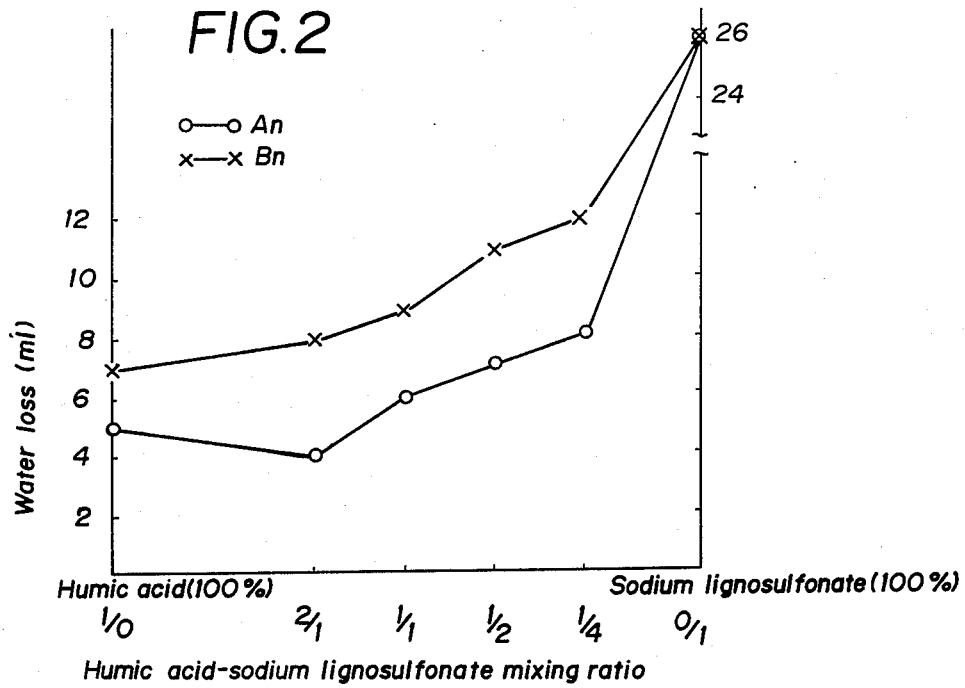

DRILLING FLUID ADDITIVES

This is a continuation of application Ser. No. 264,040, filed May 15, 1981, now abandoned.

BACKGROUND OF THE INVENTION

The present invention relates to improved additives for drilling fluids used in the drilling of oil, gas and geothermal wells in high-temperature subsurface strata or formations of the earth.

For drilling wells to extract or exploit petroleum, natural gas, geothermal fluids, underground water or other fluid minerals naturally existing in the subsurface of the earth, a so-called rotary drilling process using a drilling fluid or mud is generally applied.

In the rotary drilling, the drilling fluid is pumped into a drill pipe to be spouted out from bit nozzles for removing cuttings from the face under the bit. More specifically, the drilling fluid cools and lubricates the bit and drill stem, protects against blowouts by holding back subsurface pressures, and deposits a mud cake on the wall of the borehole to prevent loss of fluids to the formation or influx of subsurface fluids into the borehole, in addition to its function of bringing the cuttings to the surface as they are removed from the face under the bit.

As such a drilling fluid or mud playing these important roles in the rotary drilling, a water-clay based mud is typically used which is an aqueous suspension of a clay conditioned with several additives. As such a clay, commonly used as bentonite which is a colloidal clay, mainly composed of montmorillonite, which swells when wet.

Among various additives for conditioning such bentonite-type drilling muds, polyphosphoric acids, sodium lignosulfonate, chromium iron lignosulfonates, sodium humate, sodium chromohumate, combinations of lignin and humic acid or the like substances are used as dispersants or deflocculating agents.

However, since drilling fluids or muds conditioned with such prior art dispersants are thermally weak, they undergo such a remarkable gelation that the bit gets clogged and the drilling rate is substantially reduced, when used for drilling in high-temperature formations. The gelation referred to herein denotes a state of a drilling fluid in which the colloidal particles of the clay, namely, its main constituent, lose their dispersability or deflocculatability to turn into a jellylike state or to be semisolidified with a substantial loss of fluidity or the mud.

Further, if the circulation of the drilling fluid is suspended because of troubles or by some other causes, the drilling fluid may gel to such an extent that the rotary motion of the drill pipe is stuck. Even if the drill pipe is not restricted, a thick mud cake or the wall of the wellbore may be peeled off to restrict the drill pipe because a strong force will be applied suddenly on the wall of the wellbore when the drilling is started again with the drill pipe surrounded by such gelled mud. While, if Dyna-Drill, a downhole motor driven by a drilling fluid that imparts rotary motion to a drilling bit connected to the tool, is used for drilling, the drilling fluid must be continuously controlled to specified high fluidity within particularly narrow limits.

As a drilling fluid additive that does not lose the stability even in the drilling of wells in high-temperature formations, Japanese Patent Publication No. 53(1978)-35,875 discloses combinations of alkali metal salts of humic acid and mineral bitumen. However, experiments by the inventors have revealed that these patented additives have a heat resistance up to about 180° C., but they are gradually deteriorated at higher temperatures to lose their functions almost completely at about 200° C.

Besides these, Japanese Patent Publication No. 53(1978)-33,953 and British Pat. No. 1,276,411 disclose alternative drilling fluid additives with the former being directed to additives comprising sulfonated lignite or sulfonated humic acid and complex compounds of phenol condensates and transition metals and the latter to additives comprising a mixture of at least one alkali salt of sulfonated lignite or sulfonated humic acid and at least one metal chelate thereof. In these prior art literature, the lignite generically means various carboniferous materials graded intermediate the peat and the bituminous coal and, more specifically, such coalful materials containing at least about 40%, ordinarily about 50% to 60% by weight of humic acid as dry.

The teaching of the aforecited Japanese Patent Publication No. 53(1978)-33,953 and British Pat. No. 1,276,411 are characterized by the use of sulfonated lignite or sulfonated humic acid with a resultant reduction in the water loss or undesirable migration of the liquid part of the mud into a formation and improvement in gel strength as well as in thermal stability.

However, elevated temperature aging tests have shown that the foregoing prior art drilling fluid additives begin to show deterioration in their functions at about 180° C. to become unusable practically at about 220° C.

Although these facts will not give rise to any problem so long as normal drilling operations concerned.

In ordinary drilling operations, the drilling fluid pumped into the drill pipe is spouted out of the bit nozzle and rises up to the surface through the annulus between the wall of the wellbore and the casing. After separating the cuttings on the shale shaker on the surface, it is pumped again into the drill pipe for a recycled use if its temperature is not so high. However, if its temperatue is elevated (ordinarily at temperatures higher than about 60° C.), the drilling fluid is cooled before recirculation.

Therefore, no difficulties will be encountered in using drilling fluids conditioned with the aforementioned prior art additives so long as the drilling is continued under normal conditiones.

However, if the drilling is suspended for replacement of the drill bit or because of troubles of the drilling equipment, the circulation of the drilling fluid is stopped. Then, the drilling fluid is heated by the geothermal heat to gel itself because the drilling fluid additive contained therein will lose its functions.

Also, when a casing pipe is to be cemented, the drilling operation is suspended until the cement is hardened, and the drilling fluid will undergo deterioration in this cementing period.

Further, if the drilling fluid is once exposed to elevated temperatures due to a prolonged stay in a wellbore, it cannot be used for recirculation any more even if it is not severely affected to gel. Thus, after a prolonged suspension of the drilling operation, the semisolidified mud column must be removed from the wellbore, which is a laborious and time-consuming work.

While, in the drilling of a geothermal well, it is customary that the drilling operation is suspended for 36 to 72 hours for the measurement of the temperature distribution in the formations. Thus, if the drilling fluid gels during such a prolonged suspension of the drilling operation, it becomes impossible to hang down a temperature sensor in the wellbore.

As petroleum, natural gas or geothermal fluids are exploited from deeper points of the earth in recent years than ever, the formation pressure and geothermal temperature increase significantly, and it has become practically impossible for the aforementioned prior art drilling fluid additives to provide satisfactory drilling fluid conditioning functions and properties such as deflocculating effect, clay swell suppression effect and thermal stability. Particularly, when used in the drilling at these elevated temperatures as encountered in the deeper points of the earth, they show such a remarkable reduction in their water loss preventing function that a large amount of newly prepared mud must be added. Especially, in those wells deeper than 1,000 m, the volume of the drilling fluid undergoing deterioration by geothermal heat will amount to several hundred kiloliters in total. Thus, if such a large quantity of the drilling fluid is to be discarded, the drilling operation will be delayed by the days required for conditioning a new drilling fluid, in addition to a great economical disadvantage.

Under these circumstances, the present invention has been achieved with a view to overcoming the aforementioned drawbacks of the prior art drilling fluid additives.

SUMMARY OF THE INVENTION

Accordingly, an object of the present invention is to provide an improved drilling fluid additive comprising a complex compound or complex compounds composed of nitric acid, at least one compound to be selected out of a group of compounds of titanium, zirconium and hafnium belonging to group IVb of the periodic table and, as desired, at least one lignin.

According to the present invention, the aforesaid nitrohumic acid may comprise a nitrohumic acid-containing material obtained by nitrating a lignite. The lignite herein referred to generically denotes carboniferous materials having a low rank of coalification and, more specifically, peat, lignite in a narrow sense and brown coal. The humic acid herein referred to denote natural humic acids and those alkali-soluble but acid-insoluble amorphous organic acids existing in the aforementioned lignites. While, the nitrohumic acid herein referred to denote those amorphous organic acids obtained by oxidizing the aforementioned lignites which contain larger amounts of carboxyl groups, phenolic hydroxyl groups and alcoholic hydroxyl groups than the aforementioned humic acids.

The nitrohumic acids differ from the humic acids in their solubility in a mixed solvent composed of water and acetone at a mixing ratio of 1:4. That is to say, the humic acids dissolve in this mixed solvent only up to 20%, ordinarily up to 10%, while the nitrohumic acids can dissolve at least 40%, ordinarily 50% to 70%.

The lignins herein referred to include lignosulfonic acid, lignosulfonates, thiolignins, salts of thiolignins and so forth. Among those, most typically usable are those lignosulfonates which are by-products of pulp making.

The compounds of titanium, zirconium and hafnium belonging to group IVb of the periodic table include sulfates, nitrates, carbonates, oxides, halides and hydroxides of these elements of the titanium group. These compounds readily react in their aqueous solutions with nitrohumic acid or lignins to produce complex compounds.

Especially, if one of the foregoing compounds is added to an aqueous dispersion containing both nitrohumic acid and a lignosulfonate, not only complex compounds of the nitrohumic acid and of the lignosulfonate but also a futher complex of these two components will be produced. Although its chemical structure is not clarified yet, the aforesaid further complex compound is supposed to be an organic complex compound in which the nitrohumic acid and lignosulfonate are bonded together chemically and/or physically.

The aforementioned compounds of the elements belonging to group IVb of the periodic table may be compounds containing two or more of such elements, and their sulfates, nitrates, carbonates, oxides, halides and hydroxides may be used singly or as mixtures thereof. For hafnium, since all zirconium ores contain a minor amount of hafnium and the latter is extracted concomitonly with zirconium, it may be advantageous to use materials obtained from such zirconium ores, as desired.

Although the quantity of the aforementioned compounds of titanium group metals to be mixed in the formulation of the present invention may be appropriately selected for a specific purpose of the resultant drilling fluid additives, it is preferable to mix about 0.5 to 50 parts by weight of such a metal compounds with 100 parts by weight of nitrohumic acid and/or lignins. Further, if both the nitrohumic acid and lignins are to be used, they may be reacted with the aforementioned metal compounds beforehand, respectively, followed by mixing the resultant complex compounds for a further reaction.

Generally, the drilling fluid additives according to the present invention are used as their aqueous dispersion or muds containing bentonite or the like viscosifiers and, as required, weighting materials. Also, they are used at pH 9 or in a more alkaline range. While, the drilling fluid additives of the present invention are generally stored as powder, but if necessary they may be added to muds directly as solutions or aqueous dispersions as they are produced.

BRIEF DESCRIPTIONS OF THE DRAWINGS

FIG. 1 is a graph showing the gel strength of drilling fluids as a function of the mixing ratio of humic acid and sodium lignosulfonate in drilling fluid additives; and FIG. 2 is a graph showing the water loss of drilling fluids as a function of the mixing ratio of humic acid and sodium lignosulfonate in drilling fluid additives.

DESCRIPTION OF THE PREFERRED EXAMPLES

Hereinafter, the present invention will be described further by way of the preferred examples thereof as compared with the reference examples, in which lignite from Yamanashi Prefecture, Japan (hereinafter shall be referred to as lignite A) and lignite from Hopie, China (hereinafter shall be referred to as lignite B) having the properties given in Table 1 below were used together with reagent-grade sodium lignosulfonate produced by Tokyo Kasei Kogyo Kasei Kogyo Co., Ltd., Japan. However, it is to be noted here that such specific lignites and their places of origin as well as properties are outside the scope of the present invention and, thus, should not be construed in any limiting sense to the present invention.

TABLE 1

| Lignites | Moisture content (wt. %) | Composition by technical analysis (wt %) | | | Humic acid content (wt. %) | Solubility in mixture water/acetone solvent (%) |
|---|---|---|---|---|---|---|
| | | Ash content | Volatile content | Fixed carbon content | | |
| A | 40.8 | 12.2 | 47.0 | 40.8 | 2.3 | 2.3 |
| B | 13.8 | 9.9 | 50.2 | 39.9 | 81.3 | 1.3 |

Preparation of nitohumic acid

The aforementioned lignites A and B were ground to 1/60-in or smaller mesh sizes, respectively. Then, to 100 parts by weight (as dry) of each of the thus ground materials, 145 parts of 38% nitric acid was added and subjected to reaction therewith for 30 minutes. The respective resultant products had a wet cake-like form and were dried into powder materials (hereinafter shall be referred to as nitrohumic acids An and Bn correspondingly to their starting materials, lignites A and B, respectively) for ease of handling.

These nitrohumic acid-containing materials An and Bn had a humic acid content and solubility in a mixed water/acetone solvent as shown in Table 2 below, respectively.

TABLE 2

| Nitrohumic acid-containing materials | Humic acid content (wt. %) | Solubility in mixed water/acetone solvent (%) |
|---|---|---|
| An | 73.0 | 67.1 |
| Bn | 85.2 | 57.1 |

Sulfonation of lignite

In 200 ml of water, dispersed was 50 g of each of the aforementioned lignites A and B. Then, 5 g of sodium hydroxide (NaOH) and 5 g of sodium bisulfite (NaHSO$_3$) were added to the resultant dispersion, and the resultant system was placed in an autoclave to be subjected to reaction at 150° C. for 16 hours. At the end of the reaction, the resultant respective products were taken out from the autoclave and dried into powder materials (hereinafter shall be referred to as lignosulfonates As and Bs correspondingly to their starting materials, lignites A and B respectively).

Evaluation of drilling fluid additives

The drilling fluid additives of the preferred examples of the present invention and reference examples were evaluated as added to a mud for conditioning the same, respectively. More specifically, a mixture was prepared of 3.0 parts by weight of each drilling fluid additive as dry powder, 5.5 parts by dry weight of bentonite, 5.0 parts by weight of ground shale, 5.0 parts by dry weight of ground tuff and 100 parts by weight of water, and was sufficiently agitated for about 10 minutes. Then, after having its hydrogen ion concentration adjusted with sodium hydroxide to pH9.5, the mixture was placed in a 2 liter autoclave having a stirrer to be aged therein at 240° C. for 16 hours. The thus aged mixture or mud was tested in accordance with API (American Petroleum Institute) Recommended Practice 13B Standard Procedure.

EXAMPLE 1

In water, 100 parts by weight of the aforementioned nitrohumic acid-containing materials An was dispersed, and 20 parts by weight of zirconium sulfate (Reagent Class 1) was added to the resultant dispersion. Then, the resultant mixture was subjected to reaction at 80° C. for 60 minutes. At the end of the reaction, the resultant product had its hydrogen ion concentration adjusted with sodium hydroxide to pH9.0 and spray-dried into a powdered product. This powdered product was tested in the aforementioned manner, the results of which are shown in Table 3 to be given herein later.

EXAMPLE 2

Except that the nitrohumic acid-containing material Bn was used, the same procedure and conditions are those of the preceding Example 1 were repeated, and the resultant product was also tested in the aforementioned manner, the results of which are shown in Table 3.

Reference 1 and 2

Except that the lignites A and B were used instead of the nitrohumic acid-containing material An, respectively, the same procedure and conditions as those of the foregoing Example 1 were repeated, and the resultant products were tested in the aforementioned manner, the results of which are also shown in Table 3.

References 3 and 4

Except that the lignosulfonates As and Bs were used instead of the nitrohumic acid-containing material An, respectively, the same procedure and conditions as those of the foregoing Example 1 were repeated, and the resultant products were tested in the aforementioned manner, the results of which are also shown in Table 3.

EXAMPLE 3

In water, 50 parts by weight of the nitrohumic acid-containing material An and 50 parts by weight of sodium lignosulfonate were dispersed, and 20 parts by weight of zirconium sulfate (Reagent Class 1) was added to the resultant dispertion. Then, the resultant mixture was subjected to reaction at 80° C. for 60 minutes. At the end of the reaction, the resultant product had its hydrogen ion concentration adjusted with sodium hydroxide to pH9.0 and spray-dried into a powdered product. This powdered product was tested in the aforementioned manner, the results of which are also shown in Table 3.

EXAMPLE 4

Except that the nitrohumic acid-containing material Bn was used instead of An, the same procedure and conditions as those of the preceding Example 3 were repeated, and the resultant product was tested in the aforementioned manner, the results of which are also shown in Table 4.

References 5 and 6

Except that the lignites A and B were used instead of the nitrohumic acid-containing material An, respectively, the same procedure and conditions as those of the foregoing Example 3 were repeated, and the resultant products were tested in the aforementioned manner, the results of which are also shown in Table 3.

References 7 and 8

Except that the lignosulfonates As and Bs were used instead of the nitrohumic acid-containing material An, respectively, the same procedure and conditions as those of the foregoing Example 3 were repeated, and the resultant products were tested in the aforementioned manner, the results of which are also shown in Table 3.

EXAMPLE 5

In water, 100 parts by weight of the nitrohumic acid-containing material An was dispersed, and 15 parts by weight of titanium sulfate (Reagent Class 1) was added to the resultant dispersion. Then, the resultant mixture was subjected to reaction at 80° C. for 60 minutes. At the end of the reaction, the resultant product had its hydrogen ion concentration adjusted with sodium hydroxide to pH9.0 and spray-dried into a powdered product. This powdered product was tested in the aforementioned manner, the results of which are also shown in Table 3.

EXAMPLE 6

In water, 50 parts by weight of the nitrohumic acid-containing material An and 50 parts by weight of sodium lignosulfonate were dispersed, and 15 parts by weight of titanium sulfate (Reagent Class 1) was added to the resultant dispersion. Then, the resultant mixture was subjected to reaction at 80° C. for 60 minutes. At the end of the reaction, the resultant product had its hydrogen ion concentration adjusted with sodium hydroxide to pH9.0 and spray-dried into a powdered product. This powdered product was tested in the aforementioned manner, the results of which are also shown in Table 3.

As clearly understood from Table 3, the drilling fluid additive prepared from nitrohumic acid is far improved over the additive prepared from the lignosulfonates in the yield point and gel strength which are parameters representing a gelation tendency of the drilling fluid conditioned with the additive. Especially, in the case where the lignite B was used as the raw material, no drilling fluid practically applicable to a use at 200° C. or higher temperature could be obtained from the lignosulfonate Bs (References 6 and 8), while well acceptable drilling fluid additives could be obtained from the nitrohumic acid-containing material Bn (Examples 2 and 4).

Thus, according to the present invention, since even those lignites that have not been applicable as raw materials of drilling fluid additives in the prior art can be used by nitrating them into nitrohumic acid-containing materials, a wider variety of materials can be used in larger amount for a stable supply of drilling additives, regardless of the properties of specific lignites.

Also, as clearly understood from Table 3, the drilling fluid additives obtained by mixing the nitrohumic acid-containing material An or Bn and sodium lignosulfonate in equal amounts are almost comparable, in their functions, with those prepared without using sodium lignosulfonate. While, for producing drilling fluid additives applicable to drilling at elevated temperatures, neither the lignites A and B nor the lignosulfonates As and Bs can be used as being mixed with sodium lignosulfonate.

Further, as clearly seen in FIGS. 1 and 2 of the accompanying drawings, drilling fluid additives prepared from sodium lignosulfonate only show such a remarkable deterioration in the gel strength and water loss properties that they cannot practically used at elevated temperatures.

TABLE 3

| | Apprent viscosity (cp) | Yield value (Lb/100 ft$^2$) | Gel strength 1 min. | Gel strength 10 min. | Water Mud loss (ml) | Water Mud cake (mm) |
|---|---|---|---|---|---|---|
| Example 1 | 26 | 7 | 0 | 1 | 5 | 0.5 |
| 2 | 42 | 10 | 2 | 8 | 7 | 1.0 |
| 3 | 23 | 5 | 0 | 1 | 6 | 0.5 |
| 4 | 32 | 8 | 1 | 5 | 9 | 1.0 |
| 5 | 32 | 9 | 1 | 4 | 6 | 0.5 |
| 6 | 28 | 7 | 1 | 3 | 8 | 1.0 |
| Reference 1 | 89 | 64 | 6 | 24 | 8 | 1.5 |
| 2 | 71 | 51 | 6 | 37 | 10 | 1.5 |
| 3 | 80 | 30 | 3 | 18 | 10 | 1.5 |
| 4 | 50 | 27 | 4 | 20 | 12 | 2.0 |
| 5 | 70 | 55 | 3 | 14 | 8 | 1.5 |
| 6 | 54 | 51 | 8 | 34 | 11 | 2.0 |
| 7 | 40 | 20 | 2 | 10 | 10 | 1.5 |
| 8 | 45 | 17 | 3 | 23 | 12 | 2.5 |

While, it is obvious that addition of nitrohumic acid to sodium lignosulfonate in an amount of at least one-fourth (namely at least 20%) of the latter is significantly effective to improve the gel strength and water loss properties.

Although the aforementioned examples of the present invention were given only in association with zirconium sulfate and titanium sulfate, it is to be noted that substantially the same improved effects can be obtained by using their nitrates, carbonates, oxides, halides and hydroxides as well as similar salts of hafnium.

As fully described hereinbefore, the drilling fluid additives according to the present invention provides far improved deflocculating and water loss preventing functions that are hardly deteriorated at 200° C. or higher temperatures and, thus, are applicable effectively to the drilling in the depths of the earth without using sodium polyacrylate, polyacrylonitrile and so forth.

What is claimed is:

1. An aqueous clay-based mud drilling fluid additive comprising a metal chelate of an alkali salt of nitrohumic acid, said metal chelate of an alkali salt of nitrohumic acid comprising nitrohumic acid being obtained by nitric acid oxidation of lignite and said metal chelate further comprising at least one compound of a group IVb element selected from the group consisting of titanium, zirconium and hafnium.

2. An aqueous clay-based mud drilling fluid additive comprising a metal chelate of an alkali salt of nitrohumic acid and at least one lignosulfonate compound, said metal chelate of an alkali salt of nitrohumic acid comprising nitrohumic acid being obtained by nitric acid oxidation of lignite, and said metal chelate further comprising at least one compound of a group IVb element selected from the group consisting of titanium, zirconium and hafnium.

3. The drilling fluid additive of claim 1, wherein said group IVb compound comprises zirconium sulfate.

4. The drilling fluid additive of claim 2, wherein said lignosulfonate compound comprises sodium lignosulfonate and said group IVb compound comprises zirconium sulfate.

5. The drilling fluid additive of claim 1, wherein said group IVb compound comprises titanium sulfate.

6. The drilling fluid additive of claim 2, wherein said lignosulfonate compound comprises sodium lignosulfonate and said group IVb compound comprises titanium sulfate.

7. The drilling fluid additive of claim 1, wherein said drilling fluid additive comprises 100 parts per weight of said nitrohumic acid and 15 to 20 parts per weight of said group IVb compound.

8. The drilling fluid additive of claim 2, wherein said drilling fluid additive comprises 50 parts per weight of said nitrohumic acid, 50 parts per weight of said lignosulfonate compound and 15 to 20 parts per weight of said group IVb compound.

9. An aqueous clay-based mud drilling fluid additive comprising a metal chelate of an alkali salt of nitrohumic acid, said metal chelate of an alkali salt of nitrohumic acid comprising nitrohumic acid being obtained by nitric acid oxidation of lignite and said metal chelate further comprising at least one compound selected from the group consisting of sulfates, nitrates, carbonates, oxides, halides and hydroxides of a group IVb element selected from the group consisting of titanium, zirconium and hafnium.

* * * * *